United States Patent [19]

Chen

[11] Patent Number: 4,842,364

[45] Date of Patent: Jun. 27, 1989

[54] FIBER OPTIC CABLE INNERDUCT PLUG AND ASSEMBLY

[75] Inventor: Chung F. Chen, Mission Viejo, Calif.

[73] Assignee: Jack Moon Co. Ltd., Taiwan, Taipei, Taiwan

[21] Appl. No.: 255,375

[22] Filed: Oct. 11, 1988

[51] Int. Cl.$^4$ .......................... G02B 6/44; H02G 3/00
[52] U.S. Cl. .............................. 350/96.23; 350/96.20; 174/70 R
[58] Field of Search ............... 350/96.20, 96.21, 96.22, 350/96.23; 174/70 R

[56] References Cited

U.S. PATENT DOCUMENTS

| | | | |
|---|---|---|---|
| 3,946,467 | 3/1976 | Lukas et al. | 350/96.20 X |
| 4,140,366 | 2/1979 | Makuch et al. | 350/96.22 |
| 4,208,092 | 6/1980 | Monaghan et al. | 350/96.21 |
| 4,354,731 | 10/1982 | Mouissie | 350/96.20 X |
| 4,447,120 | 5/1984 | Borsuk | 350/96.20 |
| 4,534,617 | 8/1985 | Kloots et al. | 350/96.20 |
| 4,674,833 | 6/1987 | Des Forges et al. | 350/96.21 |
| 4,679,895 | 7/1987 | Huber | 350/96.20 |
| 4,684,210 | 8/1987 | Matsunaga et al. | 350/96.20 |
| 4,687,294 | 8/1987 | Angeles | 350/96.23 |
| 4,696,537 | 9/1987 | Bauer et al. | 350/96.20 |
| 4,711,520 | 12/1987 | Bernardini | 350/96.20 |
| 4,733,934 | 3/1988 | Wais et al. | 350/96.20 |
| 4,741,593 | 5/1988 | Fochler | 350/96.23 |
| 4,743,088 | 5/1988 | Balyasny et al. | 350/96.20 |
| 4,793,684 | 12/1988 | Oppenlander | 350/96.23 |
| 4,804,244 | 2/1989 | Hasegawa et al. | 350/96.20 |

FOREIGN PATENT DOCUMENTS

| | | | |
|---|---|---|---|
| 2291510 | 11/1976 | France | 350/96.21 X |
| 2611825 | 9/1988 | France | 350/96.23 X |
| 242293 | 1/1987 | German Democratic Rep. | 350/96.23 X |
| 55-35359 | 3/1980 | Japan | 350/96.21 X |
| 62-50712 | 3/1987 | Japan | 350/96.15 X |
| 62-83709 | 4/1987 | Japan | 350/96.20 X |
| WO87/04573 | 7/1987 | PCT Int'l Appl. | 350/96.23 X |
| 2096348 | 10/1982 | United Kingdom | 350/96.20 X |

Primary Examiner—William L. Sikes
Assistant Examiner—Brian M. Healy
Attorney, Agent, or Firm—Donald E. Nist

[57] ABSTRACT

The plug is disposable around a fiber optic cable in an innerduct to form the present assembly. The plug releasably seals the cable and innerduct against ingress of mud, dirt, water, grit and other foreign substances. The plug includes upper and lower rigid compression plates positioned, respectively, immediately above and below a flexible, resilient tubular gasket having an upper circular flange. The lower compression plate has two or more spaced vertical curved arms disposed in a circle around a central vertical cable-receiving passageway and extending up from the plate through slots in the gasket and upper compression plate. The arms are threaded externally and hae an internally threaded collar screwed down thereover. The collar, upper plate and flange seat over theopen end of an innerduct bearing the cable. the lower compression plate and gasket (except for the flange) are in the innerduct. The gasket, upper and lower compression plates and collar have aligned cable-receiving vertical passageways. When the collar is crewed down tightly, the lower plate is pulled up towards the upper plate, compressing and bulging the gasket externally and internally to effectively seal the plug in the innerduct and the cable in the plug.

12 Claims, 2 Drawing Sheets

FIBER OPTIC CABLE INNERDUCT PLUG AND ASSEMBLY

BACKGROUND OF THE INVENTION

1. Field of the Invention

The present invention generally relates to sealing means and more particularly to an improved plug for sealing a fiber optic cable and an innerduct containing the cable.

2. Prior Art

Various types of plugs have been employed for sealing fiber optic cables in innerduct systems. Most have been unsuccessful. One fiber optic plug employs a number of bolts and nuts to hold and tighten the component parts. However, such plugs are difficult to install and remove, requiring tools. They must be installed in the innerduct before the cable is placed therein. Moreover, the steel bolts and nuts can rust, complicating the already difficult removal of the plug. In addition, such a plug cannot be made small enough to fit small fiber optic cable innerducts, because there is no proper clearance and support in the device for the bolts and nuts.

Accordingly, there remains a need for an improved fiber optic cable innerduct plug which can be easily installed around a fiber optic cable before or after installation of the cable in an innerduct and can be as easily removed, and which has no corrodible components. Such plug should not require tools to install and remove, and should be inexpensive, durable and efficient in sealing the cable and innerduct from foreign substances. The plug should have few parts and be capable of being used on the smallest fiber optic cable innerduct systems.

SUMMARY OF THE INVENTION

The improved fiber optic cable innerduct plug and assembly of the present invention satisfy all the foregoing needs. The plug and assembly are substantially as set forth in the Abstract of the Disclosure.

Thus, the plug includes upper and lower rigid compression plates positioned against the top and bottom of a flexible resilient cylindrical gasket. Preferably, the plates and gasket are split vertically to facilitate their installation around a fiber optic cable. The lower plate has a plurality of upright externally threaded curved arms preferably forming segments of a circle and spaced in a circle around a central vertical passageway aligned with similar passageways in the gasket and upper plate. The arms fit up through slots in the gasket and upper plate and protrude thereabove for threaded engagement by a vertically split top locking collar, the two halves of which are interlocked. The collar has an internally threaded central passageway aligned with those of the other components.

The main portions of the gasket and lower compression plate fit within an innerduct, while the remainder of the device is disposed on the outside at the end of the innerduct. A fiber optic cable is disposed in the aligned passageways and extends from the innerduct out the end thereof. When the collar is tightened down over the arms, the lower plate is pulled up towards the upper plate, compressing the gasket and causing it to bulge externally to seal the innerduct and internally to seal the cable, thus preventing ingress of foreign substances. The plug can be easily removed merely by partly unscrewing the collar, pulling out the plug, unscrewing the collar from the plug and splitting it to separate it from the cable, then splitting off the remaining plug components from the cable.

The plug can be made in a variety of sizes from non-corrodible inexpensive materials, is durable and efficient and requires no tools to install or remove. Further features of the present invention are set forth in the following detailed description and accompanying drawings.

DRAWINGS

FIG. 1 a schematic side perspective view of a first preferred embodiment of the lower compression plate of the plug of the present invention;

DETAILED DESCRIPTION

FIGS. 1-4, 8-10

Figure 8:
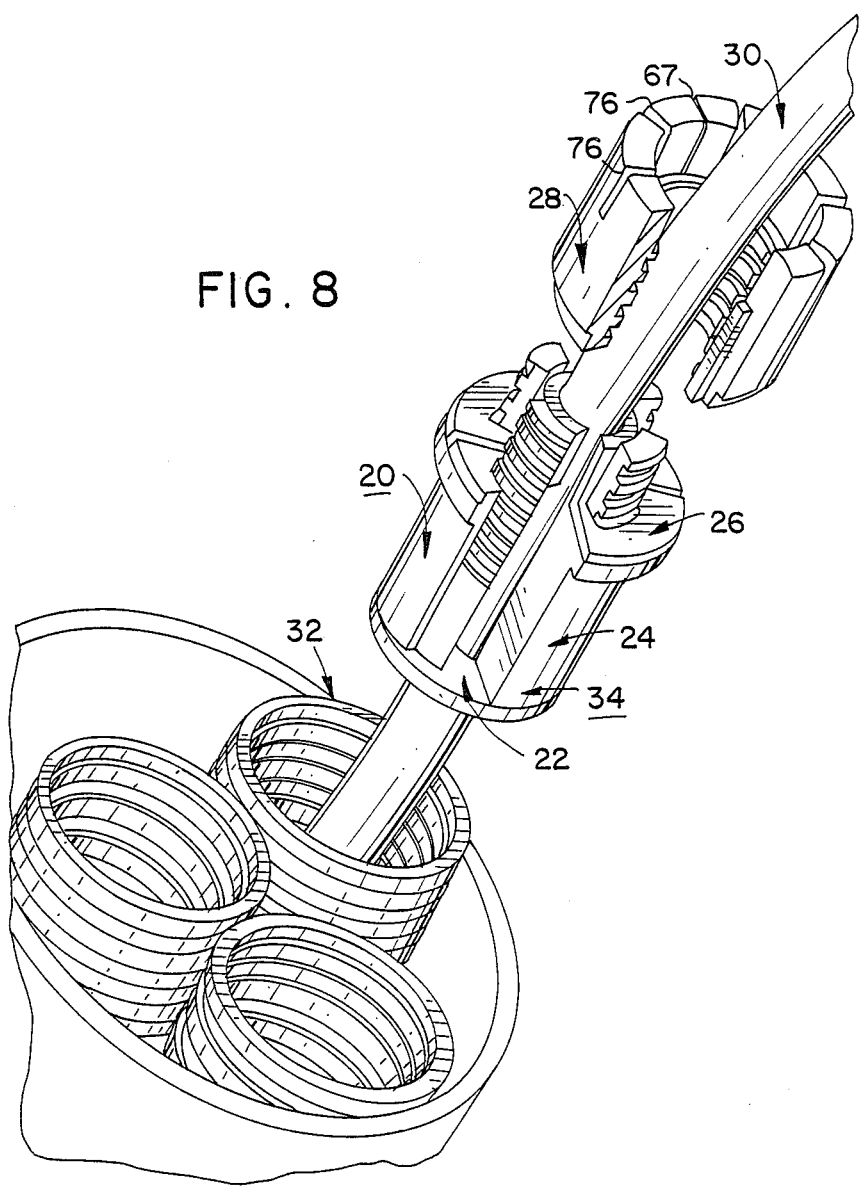
FIG. 8 is a schematic exploded perspective view of the plug, the components are illustrated in FIGS. 1-4, around a fiber optic cable disposed in an innerduct, forming a preferred embodiment of the assembly of the present invention.
Figure 9:
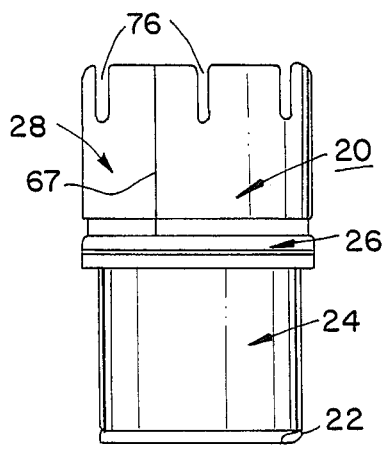
FIG. 9 is a schematic side elevation of the plug of FIG. 8 in the relaxed, non-sealing condition; and, FIG. 10 is a schematic side elevation, partly in section and partly broken away, of the plug of FIG. 8 in the innerduct of FIG. 8, with the collar thereof screwed tightly to compress the gasket thereof to cause external bulging of the gasket and sealing to the innerduct.
Figure 10:
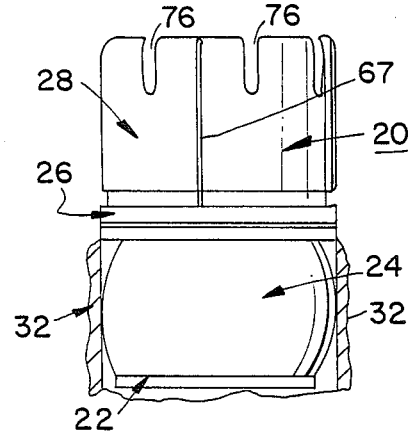

Now referring more particularly to FIGS. 1-4 and 8-10 of the drawings, a first preferred embodiment of the plug of the present invention is schematically depicted therein, FIG. 8 showing a preferred embodiment of the assembly of the present invention.

Thus, plug 20 is shown which comprises a lower compression plate 22 (FIG. 1), a gasket 24 (FIG. 2), an upper compression plate 26 (FIG. 3) and lock collar 28 (FIG. 4), disposable around a fiber optic cable 30 (FIG. 8) in an innerduct 32 to form a preferred embodiment of the present assembly 34.

Figure 1:
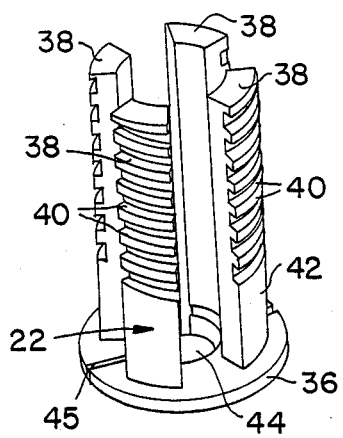
Figure 2:
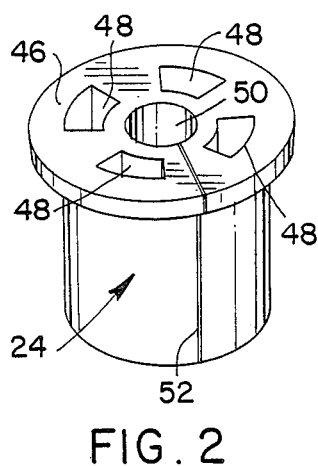
FIG. 2 is a schematic side perspective view of a first preferred embodiment of the gasket of the plug of the present invention.
Figure 3:
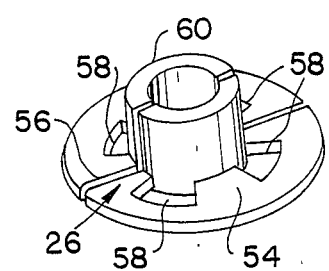
FIG. 3 is a schematic side perspective view of a first preferred embodiment of the upper compression plate of the plug of the present invention.

Lower compression plate 22 comprises a bottom horizontal circular disc 36 to which are integrally connected for identical spaced vertical arms 38 disposed in a circle and rising above disc 36. Arms 38 are curved, that is, are segments of a circle and bear threads 40 on the outer surfaces 42 thereof, as shown in FIG. 1. They surround a first central, vertical cable-receiving passageway 44 extending up through disc 36. Plate 22 is divided into two mating halves along a vertical slice line 45 (FIG. 1). Accordingly, plate 22 can be separated to introduce cable 30 to passageway 44 or remove it therefrom.

Gasket 24 is generally cylindrical with a peripherally extending circular top flange 46. The bottom of gasket 24 is adapted to releasably seat on the top of disc 36, with arms extending up through vertical slots 48 in gasket 24. Gasket 24 defines a vertical central passageway 50 aligned with passageway 44 when gasket 24 is seated on disc 36.

Gasket 24 is fabricated of natural rubber, synthetic rubber or plastic and is both flexible and resilient. It is partially divided vertically along a slice line 52 extending through one side thereof to passageway 50. Due to the flexibility of gasket 24, it can be easily spread apart to place cable 30 in passageway 50 or remove it therefrom.

Upper compression plate 26 comprises a circular horizontal disc 54 divided into two halves along a vertical slice line 56. Each half has a spaced pair of vertical slots 58 adapted to slidingly receive two arms 38 and slots 58 are disposed in a circle around an upstanding central tube 60 integral with disc 54. Tube 60 is designed to fit within the circle defined by arms 38 and to back arms 38 against inward deflection during screwing down of collar 28 thereover.

Slice line 56 extends through tube 60 so that plate 26 can be easily assembled around cable 30 and removed therefrom. Tube 60 defines a vertical central cable-receiving passageway 62 aligned with passageways 44 and 50 when plate 26 is seated on flange 46. Slots 58 have the effect of supporting arms 38 in the desired vertical orientation.

Lock collar 28 is generally cylindrical with a central vertical passageway 64 aligned with passageways 62, 44 and 50 when collar 28 is in place on the top of plug 20. Collar 28 has internal threads 66 lining passageway 64 and engageable with external threads 40 of arms 38, so that collar 28 can be screwed down over arms 38 towards disc 36, causing gasket 24 to be compressed between plates 22 and 26, resulting in gasket 24 externally bulging (FIG. 10) to releasably lock plug 20 in inner duct 32 and seal innerduct 32 against foreign substances. At the same time, gasket 24 bulges internally to compress around cable 30 when the latter is installed in plug 20, so as to tightly hold and seal cable 30 therein.

Figure 4A:
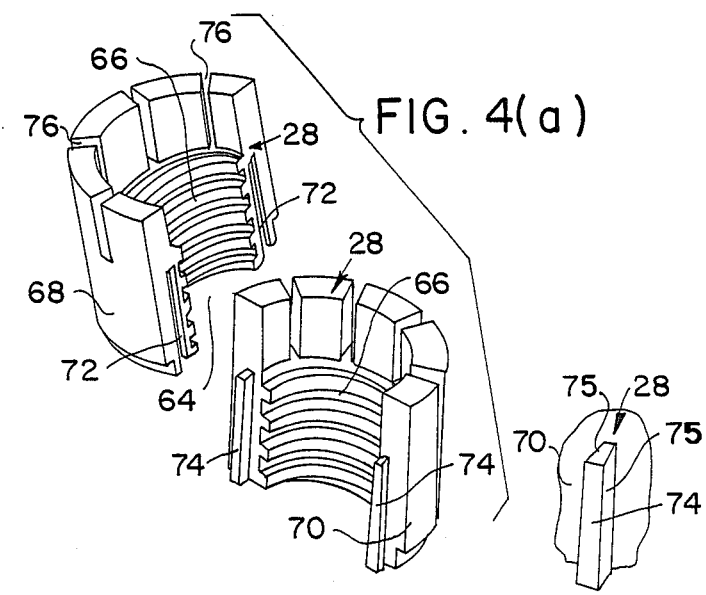
FIG. 4((a) is an schematic exploded side perspective view of a first preferred embodiment of the lock collar of the plug of the present invention.
FIG. 4(b) is an enlarged schematic perspective view of a stud on the lock collar of FIG. 4(a)
Figure 4B:
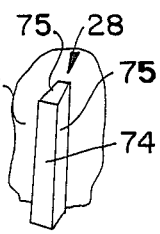

Lock collar 28 is vertically divided along a slice line 67 into two mating halves 68 and 70 (FIGS. 4(a)), half 68 having a spaced pair of identical female vertical recesses 72 on the exposed faces thereof adapted to slidingly receive a mating pair of male dovetails, studs or detents 74 on the exposed faces of half 70. Studs 74 have rearwardly tapered down sidewalls 75 which cause studs 74 to be locked into similarly shaped recesses 72 (FIG. 4(b)) when slid up therein. Collar 28 can be easily assembled around cable 30. The upper margin of collar 28 has a plurality of spaced vertical grooves 76 which aid in aligning halves 68 and 70 and which aid in providing a tool or hand grip when screwing collar 28.

Plug 20 can either be preassembled by passing arms 38 up through gasket 24 and seating gasket 24 on disc 36, then placing upper plate 26 on flange 46 with arms 38 up through slots 58 and thereafter threading collar 28 over arms 38. Cable 30 can then be inserted through passageways 44, 50, 62, and 64 and the sub-assembly can be installed in the open end of innerduct 32, with collar 28, plate 26 and flange 46 on the outside thereof and the remaining components within innerduct 32. Screwing collar 28 tight then seals innerduct 32 and cable 30, as previously desired. (See FIG. 10.)

Alternatively, if cable 30 is already installed in innerduct 32 and extends therefrom, plates 22 and 26 are first split apart, as is collar 28 and gasket 24 is pried open, so as to place the part of cable 30 which is outside innerduct 32, for example, 6-8 inches away from innerduct 32, nto the components of plug 20, after which the components of plug 20 are fully assembled as described above and plug 20 is then secured to innerduct 32. This is a distinct advantage over conventional plugs which require their assembly *before* cable 30 can be installed at all in innerduct 32.

Collar 28 and plates 22 and 26 can be made of plastic, such as polyurethane, polystyrene, polypropylene, polyvinyl chloride or other hard plastic, or hardened natural or synthetic rubber, or ceramic, metal or cermet or the like. Preferably, polyurethane or another high impact resistant non-corrodible plastic is used. Such a material is inexpensive, durable, light in weight and efficient. Plug 20 can be easily assembled and disassembled without tools, merely by fitting the components together and screwing and unscrewing collar 28.

Although the description of the novel plug of the present invention is in terms of a vertical orientation, it will be understood that a rear to front orientation or another orientation could be used, if desired.

FIGS. 5-7.

Figure 5:
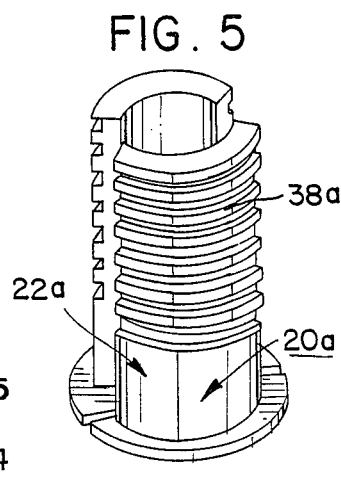
FIG. 5 is a schematic side perspective view of a second preferred embodiment of the lower compression plate of the plug of the present invention.
Figure 6:
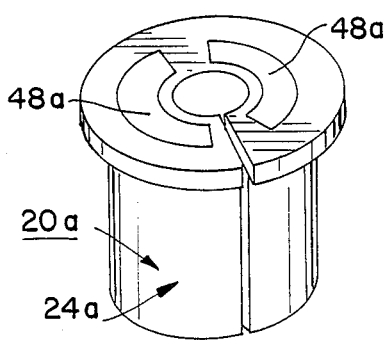
FIG. 6 is a schematic side perspective view of a second preferred embodiment of the gasket of the plug of the present invention.
Figure 7:
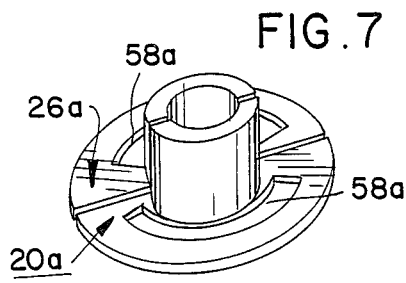
FIG. 7 is a schematic side perspective view of a second preferred embodiment of the upper compression plate of the plug of the present invention.

A second preferred embodiment of the improved plug of the present invention is schematically depicted in FIGS. 5-7. Thus, three of the four components of plug 20a are shown. Components of plug 20a similar to those of plug 20 bear the same numerals but are succeeded by the letter "a".

Plug 20a is identical to plug 20, except as follows:
a. Plate 22a has a pair of upstanding about semi-circular arms 38a instead of four arms;
b. Gasket 24a has two about semi-circular slots 48a; and,
c. Plate 26a has a pair of about semi-circular slots 58a.

Collar 28 can be used to complete plug 20a. Plug 20a has substantially the same construction, mode of operation and advantages as plug 20, except that the pair of arms 38a are stronger than the four separate arms 38.

Various other modifications, changes, alterations and additions can be made in the improved plug and assembly of the present invention. All such modifications, changes, alterations and additions as are within the scope of the appended claims form part of the present application.

PRIOR ART STATEMENT

No prior art search has been carried out on the subject matter of the present invention. So far as is known to Applicant, the closest prior art is a fiber optic duct plug employing nuts, bolts and nut caps and requiring tools to install. The nuts and bolts are of steel and capable of corroding. Moreover, they are difficult to install and remove. In addition, none of the components are split to facilitate their installation and removal. In many circumstances, the plug must be made so small that the nuts and bolts do not have proper clearance and support, and therefore cannot be used.

The plug of the present invention is patentable thereover. It does not require tools, need not employ corrodible components and cam be conveniently made in any desired size and shape. Its components can be made in a split configuration so that they can be easily installed around a fiber optic cable and removed therefrom.

What is claimed is:

1. An improved plug device for a fiber optic cable innerduct system, said device comprising, in combination:
   a. a lower rigid compression plate comprising a horizontal disc bearing a first central vertical fiber optic cable-receiving passageway extending therethrough, a plurality of upright elongated spaced arms comprising segments of a circle connected to said disc and rising thereabove, said arms being spaced in a circle around said passageway and bearing threads on the outer surfaces thereof;
   b. a flexible resilient generally cylindrical gasket having an upper circular flange and having inner surfaces defining a second vertical central fiber optic cable-receiving passageway extending therethrough aligned with said first passageway, said gasket being seated on said disc and having a plurality of curved vertical slots extending therethrough, arranged in a circle around said gasket passageway and releasably receiving said arms, which extend thereabove;
   c. an upper rigid compression plate comprising a circular horizontal disc having a central tube extending up therefrom and defining a third vertical central fiber optic cable-receiving passageway, said upper compression plate disc being seated on said flange and having a plurality of curved vertical slots extending therethrough, arranged in a circular around said tube and releasably receiving said arms, the upper portions of which extend thereabove; and,
   d. a locking collar having a fourth internally threaded central vertical fiber optic cable-receiving passageway aligned with said first, second and third passageways and threadably received over said upper portions of said arms, said collar being tightenable down over said arms to draw said lower compression plate towards said upper compression plate, causing said gasket to bulge externally for a releasably tight sealing fit in a fiber optic innerduct system in which said device can be disposed and for securely holding a fiber optic cable in said aligned passageways.

2. The improved plug device of claim 1 wherein said collar is split vertically into two interlocking halves and wherein there are four of said equally spaced arms connected to said lower compression plate.

3. The improved device of claim 1 wherein said lower compression plate, upper compression plate and collar are split vertically into two halves, wherein said collar halves are interlocking and wherein said gasket has a vertical slot the length thereof extending from one side of said flange to at least said second passageway so that said gasket is readily openable, whereby said compression plates, gasket and collar can be installed easily around a fiber optic cable for disposal in an innerduct system.

4. The improved device of claim 1 wherein said gasket comprises material selected from the group consisting of natural rubber, synthetic rubber, plastic and mixture thereof, wherein said compression plates and collar comprise rigid material selected from the group consisting of metal, ceramic, cermet, plastic, hardened rubber and mixtures thereof and wherein there are two of said arms.

5. A improved fiber optic cable innerduct plug assembly, said assembly comprising, in combination:
   a. an elongated fiber optic cable;
   b. an elongated fiber optic cable innerduct around said cable; and,
   c. an improved plug around said cable and over an open end of said innerduct, sealing said cable and innerduct against migration of foreign substances thereinto, said plug comprising, in combination:
      i. a lower rigid compression plate comprising a circular horizontal disc bearing a first central vertical passageway disposed around said cable, a plurality of upstanding elongated externally threaded spaced arms comprising circular segments connected to said disc, rising thereabove and arranged in a circle around said first passageway,
      ii. a flexible resilient generally cylindrical gasket having an upper flange and inner surfaces defining a second central passageway disposed around said cable, said gasket being seated on said lower compression plate disc, with said arms protruding up through slots in said gasket,
      iii. an upper rigid compression plate comprising a circular horizontal disc seated on said flange and bearing a central tube extending thereabove having a third vertical passageway containing said cable, said disc defining vertical slots around said tube up through which slots said arms extend, and,
      iv. a locking collar having an internally threaded vertical central passageway releasably threaded over the tops of said arms and with said cable extending up therethrough, said collar being releasably tightened down over said arms sufficiently to draw said lower plate towards said upper plate, compressing said gasket therebetween and bulging the outer surfaces thereof so as to seal said plug in said innerduct, said flange being seated on said innerduct end and said tube backing said arms against bending during tightening of said collar.

6. The improved assembly of claim 5 wherein said inner surfaces of said gasket bulge inwardly to seal said cable in said plug.

7. The improved assembly of claim 5 wherein said collar is split vertically into two interlocking halves for easy removal from around said cable, said collar protruding beyond said innerduct, and where there are four of said arms.

8. The improved assembly of claim 7 wherein said lower and upper compression plates are also split vertically into two halves to facilitate removal from around said cable and wherein said gasket is also split vertically through at least one side thereof to said passageway therein, said gasket thereby being readily openable for easy removal of said cable, said lower compression plate and said gasket, except for said flange, fitting within said innerduct.

9. The improved assembly of claim 8 wherein there are two of said arms.

10. The improved assembly of claim 8 wherein said gasket comprises material selected from the group consisting of natural rubber, synthetic rubber, plastic and mixtures thereof, wherein said compression plates and collar comprise rigid material selected from the group consisting of metal, cermet, plastic hardened rubber and mixtures thereof.

11. An improved fiber optic cable-innerduct plug device, said device comprising, in combination;
   a. a rigid lower compression plate comprising a horizontal disc having a first vertical cable-receiving passageway extending up therethrough and a plurality of upright spaced arms having curved threaded outer surfaces disposed in a circle around said passageway;
   b. a flexible resilient tubular gasket seated on said disc and having a second vertical cable-receiving passageway extending up therethrough and a plurality of vertical slots around said passageway through which slots said arms extend;
   c. a rigid upper compression plate comprising a horizontal disc disposed on the top of said gasket and a tube rising thereabove containing a third cable-receiving passageway, said disc having slots spaced around said tube through which slots said arms pass; and,
   d. a locking collar having an internally threaded fourth vertical passageway aligned with said first, second and third passageways, said collar being releasably threaded on said arms for compressing and bulbing said gasket and sealing said device in an innerduct.

12. The improved device of claim 11 wherein said two plates and said locking collar are split into two halves to facilitate installation of a fiber optic cable therein, said collar halves releasably locking together, and wherein said gasket is vertically split from one side thereof to said second passageway, whereby said gasket is openable to receive a fiber optic cable.

* * * * *

UNITED STATES PATENT AND TRADEMARK OFFICE
CERTIFICATE OF CORRECTION

PATENT NO. : 4,842,364

DATED : Jun. 27, 1989

INVENTOR(S) : Chung F. Chen

It is certified that error appears in the above-indentified patent and that said Letters Patent is hereby corrected as shown below:

In the Abstract at line 13 please delete "hae" and insert --have--.

In the Abstract at line 15 please delete "theopen" and insert --the open--.

In the Abstract at line 16 please delete "the lower" and insert --The lower--.

In the Abstract at line 20 please delete "crewed" and insert --screwed--.

In Column 2 at Line 11 please insert --is-- after "FIG. 1".

In Column 2 at line 20 please delete "4((a)" and insert --4(a)--.

In Column 2 at line 20 please delete "an" and insert --a--.

In Column 2 at line 63 please delete "for" and insert --four--.

In Column 3 at line 44 please delete "inner duct" and insert --innerduct--.

In Column 4 at line 3 please delete "desired" and insert --described--

In Column 4 at line 9 please delete "nto" and insert --into--.

In Column 4 at line 67 please delete "cam" and insert --can--.

In Column 5 at line 31 please delete "circular" and insert --circle--.

In Column 5 at lines 63-64 please delete "mixture" and insert --mixtures--.

UNITED STATES PATENT AND TRADEMARK OFFICE
CERTIFICATE OF CORRECTION

PATENT NO. : 4,842,364
DATED : Jun. 27, 1989
INVENTOR(S) : Chung F. Chen

It is certified that error appears in the above-indentified patent and that said Letters Patent is hereby corrected as shown below:

In Column 6 at line 1 please change "A improved" to --An improved--.

In Column 8 at line 7 please change "bulbing" to --bulging--.

Signed and Sealed this

Fourth Day of August, 1998

Attest:

BRUCE LEHMAN

Attesting Officer

Commissioner of Patents and Trademarks